United States Patent
Wilkens

[19]

[11] Patent Number: 6,110,049

[45] Date of Patent: Aug. 29, 2000

[54] DEVICE FOR SIMULATING LONGITUDINAL AND TRANSVERSE ACCELERATIONS ON A VEHICLE COMPARTMENT

[75] Inventor: Rolf Wilkens, Bremen, Germany

[73] Assignee: STN Atlas Elektronik GmbH, Bremen, Germany

[21] Appl. No.: 09/077,075

[22] PCT Filed: Sep. 24, 1996

[86] PCT No.: PCT/EP96/04155

§ 371 Date: May 18, 1998

§ 102(e) Date: May 18, 1998

[87] PCT Pub. No.: WO97/19434

PCT Pub. Date: May 29, 1997

[30] Foreign Application Priority Data

Nov. 17, 1995 [DE] Germany .................. 195 42 869

[51] Int. Cl.[7] ............................................. G09B 9/04
[52] U.S. Cl. ........................... 472/37; 472/36; 472/43
[58] Field of Search ............................. 472/1, 2, 28, 29, 472/30, 31, 36, 37, 38, 43, 47

[56] References Cited

U.S. PATENT DOCUMENTS

| | | | |
|---|---|---|---|
| 739,691 | 9/1903 | Manig | 472/37 |
| 863,362 | 8/1907 | Croshier | 472/31 |
| 3,141,669 | 7/1964 | Chul | 472/29 |
| 3,581,560 | 6/1971 | Odier . | |
| 3,642,275 | 2/1972 | Ellico | 472/37 |
| 4,251,140 | 2/1981 | Fogerty, Jr. . | |
| 4,856,771 | 8/1989 | Nelson | 472/2 |
| 5,022,708 | 6/1991 | Nordella et al. . | |
| 5,060,932 | 10/1991 | Yamaguchi | 472/47 |
| 5,527,221 | 6/1996 | Brown et al. | 472/31 |
| 5,558,582 | 9/1996 | Swensen et al. | 472/43 |
| 5,669,773 | 9/1997 | Gluck | 472/1 |

FOREIGN PATENT DOCUMENTS

| | | |
|---|---|---|
| 0694896 | 1/1996 | European Pat. Off. . |
| 3133124 | 3/1983 | Germany . |
| 4109827 | 10/1992 | Germany . |

Primary Examiner—Sam Rimell
Attorney, Agent, or Firm—Venable; George H. Spencer; Catherine M. Voorhees

[57] ABSTRACT

The device for simulating longitudinal and transverse accelerations on a vehicle compartment has a first motion level for longitudinal displacement of the compartment and, placed on top of the former, a second motion level for transverse displacement of the compartment. To simplify the construction in the interests of low production costs and to allow large mechanical loads to be applied while keeping the height of the assembly low, a pair of bogies configured at a fixed longitudinal distance from one another can run in each level on the appropriate one of two parallel tracks. Each track of the mutually perpendicular pairs is at least in the front and rear track regions uniformly ascending. The second motion level directly accommodates the vehicle compartment.

20 Claims, 8 Drawing Sheets

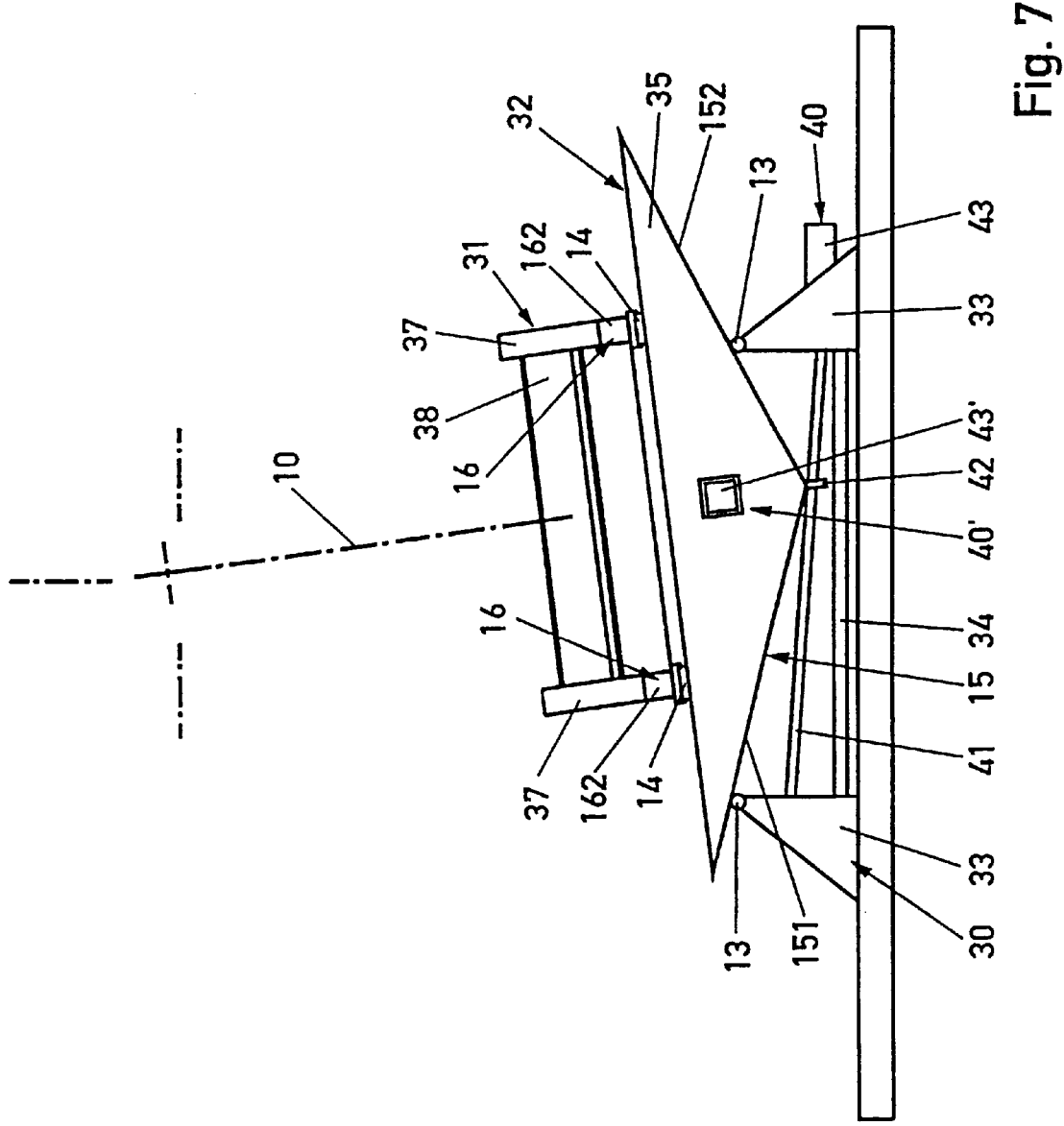

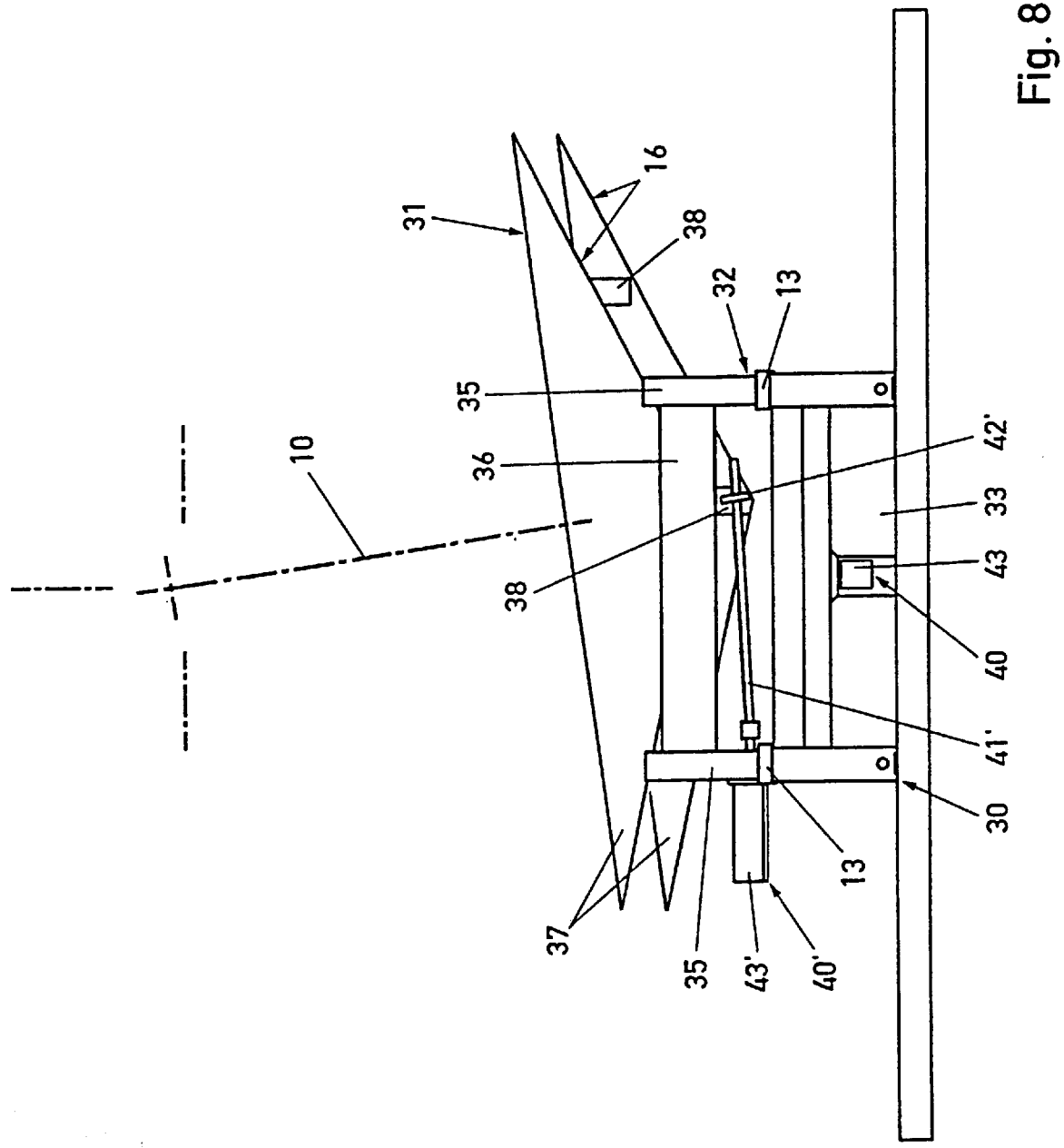

DEVICE FOR SIMULATING LONGITUDINAL AND TRANSVERSE ACCELERATIONS ON A VEHICLE COMPARTMENT

BACKGROUND OF THE INVENTION

The invention relates to an apparatus for simulating longitudinal and transverse accelerations on a vehicle compartment of a vehicle, having a first motion level for longitudinal displacement of the compartment in which a pair of bogie wagons can travel on one of two parallel-spaced rails where the rails ascend uniformly, at least in the front and rear regions of the rail ends, and are symmetric to the center of the rails and a second motion level which is located above the first motion level for transverse displacement of the compartment and in which a second pair of bogie wagons can travel on one of two parallel-spaced rails that extend perpendicular to the rails of the first motion level.

In a known motion simulator of this type for a high-speed rail vehicle, the pair of rails associated with the first plane of motion is disposed on a base frame with two ramps that ascend from the center toward the edge at the same angle of ascension, with each rail of a rail pair being divided into two rail segments, each of which is secured to one of the ramps. The four bogie wagons respectively located on one of the four rail segments support an intermediate frame, on the upper side of which the rail pair associated with the second plane of motion is secured in a level plane. The four bogie wagons that run on the second rail pair support a platform that receives the vehicle compartment with the interposing of a tipping mechanism for inclining the vehicle compartment laterally about a horizontal axis oriented transversely to the rails extending on the intermediate frame. With corresponding control of the drive motors for the intermediate frame and the platform, as well as the tipping mechanism, the vehicle compartment can be moved for simulating longitudinal and transverse accelerations with an inclination of the vehicle in the longitudinal and transverse directions. This type of apparatus for motion simulation is very costly to build, and has a relatively large structural height as dictated by the presence of base frames, intermediate frames, the platform and the tipping mechanism.

It is the object of the invention to provide an apparatus for motion simulation of the type mentioned at the outset that can be manufactured at low cost because of a simplified technical construction, and can receive large mechanical loads, such as heavy vehicle compartments and so-called domes for viewing system simulation, and also has a small structural height.

In accordance with the invention, the object is accomplished in an apparatus for motion simulation of the generic type defined in the preamble to claim 1 and having the features of the characterizing portion of claim 1.

SUMMARY OF THE INVENTION

The apparatus of the invention for motion simulation has the advantage that a lateral, inclined motion of the vehicle compartment is produced by a simple rail guidance, without a tipping mechanism that is costly to produce. The omission of the tipping mechanism not only lowers production costs, but also results in a low construction. Rails and bogie wagons need not be specially manufactured individually, but are commercially available in diverse dimensions and qualities for reasonable prices. It is possible to stress the apparatus of the type described in the first paragraph of the BACKGROUND OF THE INVENTION where the rails associated with the first motion level are secured to a stationary base frame and the rails associated with the second motion level are secured to the underside of a platform which faces the base frame and supports the vehicle compartment, and a movable connection with three mutually perpendicular axes of rotation exists between each of the bogie wagons that travel on the rails of the base frame and a bogie wagon that travels on the rails of the platform invention considerably more without reducing or electric-motor-actuated actuators of a tipping mechanism. The apparatus of the invention permits a very good simulation of purely translatory motions with a simultaneous superposed inclination, both in the longitudinal and transverse directions, with a structurally simple system that can be put under tremendous stress. This system can be used in extremely faithful simulation of sustained accelerations in the longitudinal and transverse directions. Vertical accelerations of the system remain beneath the perceptible limit. The drives can be electrical, hydraulic or pneumatic.

The further claims disclose useful embodiments of the apparatus of the invention for motion simulation that involve advantageous refinements and modifications of the invention.

In accordance with a preferred embodiment of the invention, the rails associated with the first motion plane are secured to a stationary base frame, and the rails associated with the second motion plane are secured to the underside of a platform that supports the vehicle compartment, which side faces the base frame. A movable connection with three axes of rotation that are oriented perpendicular to one another and can be embodied with, for example, a ball-and-socket joint exists between each of the bogie wagons traveling on the rails of the base frame and a bogie wagon traveling on the rails at the platforms. This construction produces an extremely low structure that is very sturdy and can handle a great deal of stress. With the arrangement of the rails and the spacing of the platform bearing points, both the angle of inclination and the platform design can be varied and adapted to different requirements. With specially-shaped guide rails, the course of the rail curve permits the point of sight or the center of the platform to be kept in one plane in a horizontal deflection of the platform.

In an alternative embodiment of the invention, the two motion planes can be realized with rails and bogie wagons in that the bogie wagons associated with the first motion plane are secured to a stationary base frame, and the rails associated with the first motion plane are disposed on the underside of an intermediate frame. The bogie wagons associated with the second reference plane are disposed on the top side of the intermediate frame, and the rails associated with the second motion plane are disposed on the underside of a platform that supports the vehicle compartment. The inclusion of the intermediate frame results in a slightly larger structural height of the overall system, but the translatory drive for longitudinal and transverse motion of the vehicle compartment with a superposed inclination is simplified significantly.

In accordance with an advantageous embodiment of the invention, the translatory drive in the apparatus is realized in that a spindle drive whose spindle is driven by an electric motor, and that has a spindle nut that can be screwed up and down on the spindle, is disposed on the base frame and the intermediate frame, respectively. The two spindles are oriented perpendicular to one another, and extend through the center between the rails at the intermediate frame or the platform, respectively. The spindle nut is hinged in the center to the intermediate frame or the platform.

The invention is described in detail below in embodiments illustrated in the drawing. Shown in the following schematic illustrations are:

DETAILED DESCRIPTION OF THE INVENTION

Figure 1:
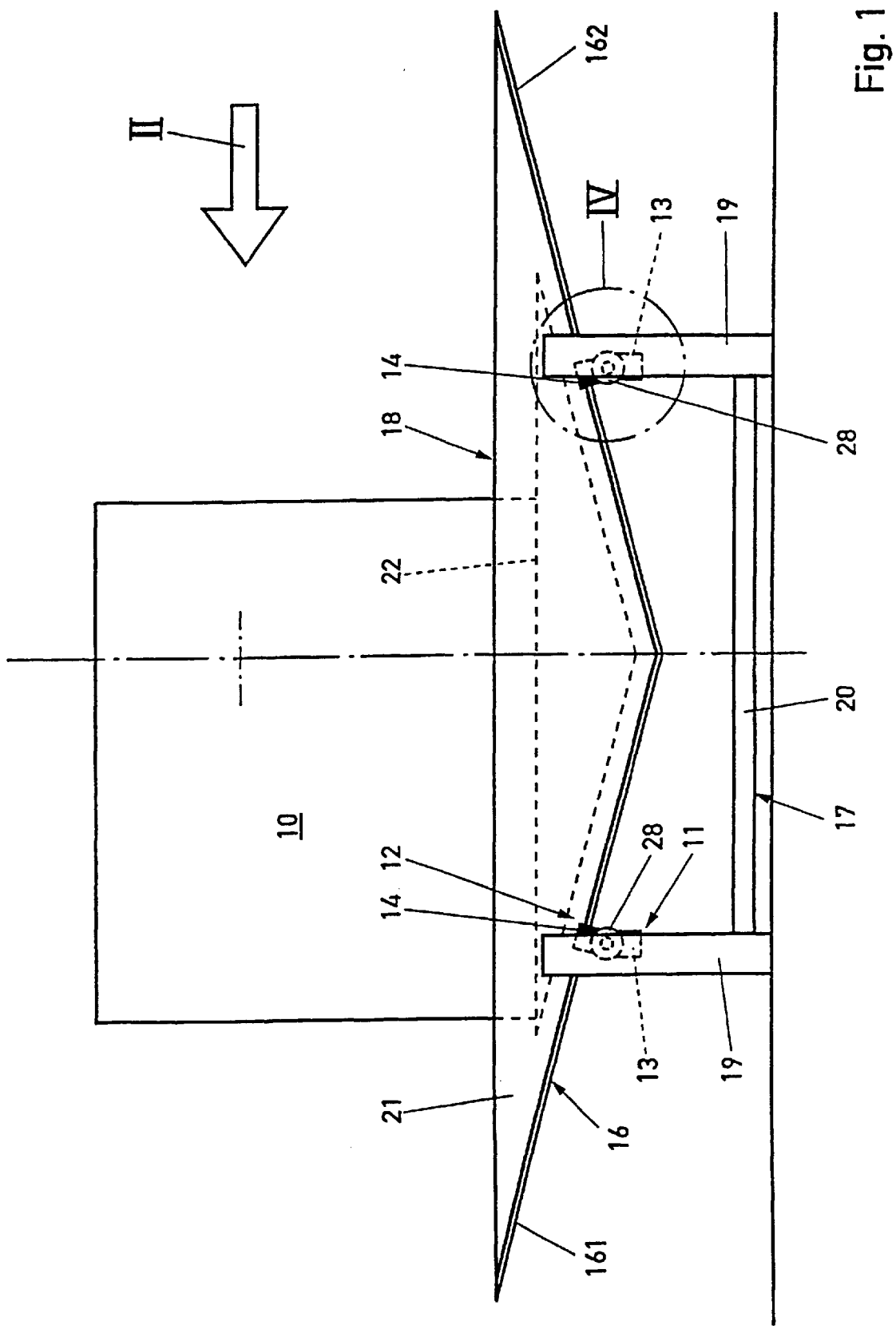
FIG. 1 a side view of an apparatus for simulating motion.
Figure 2:
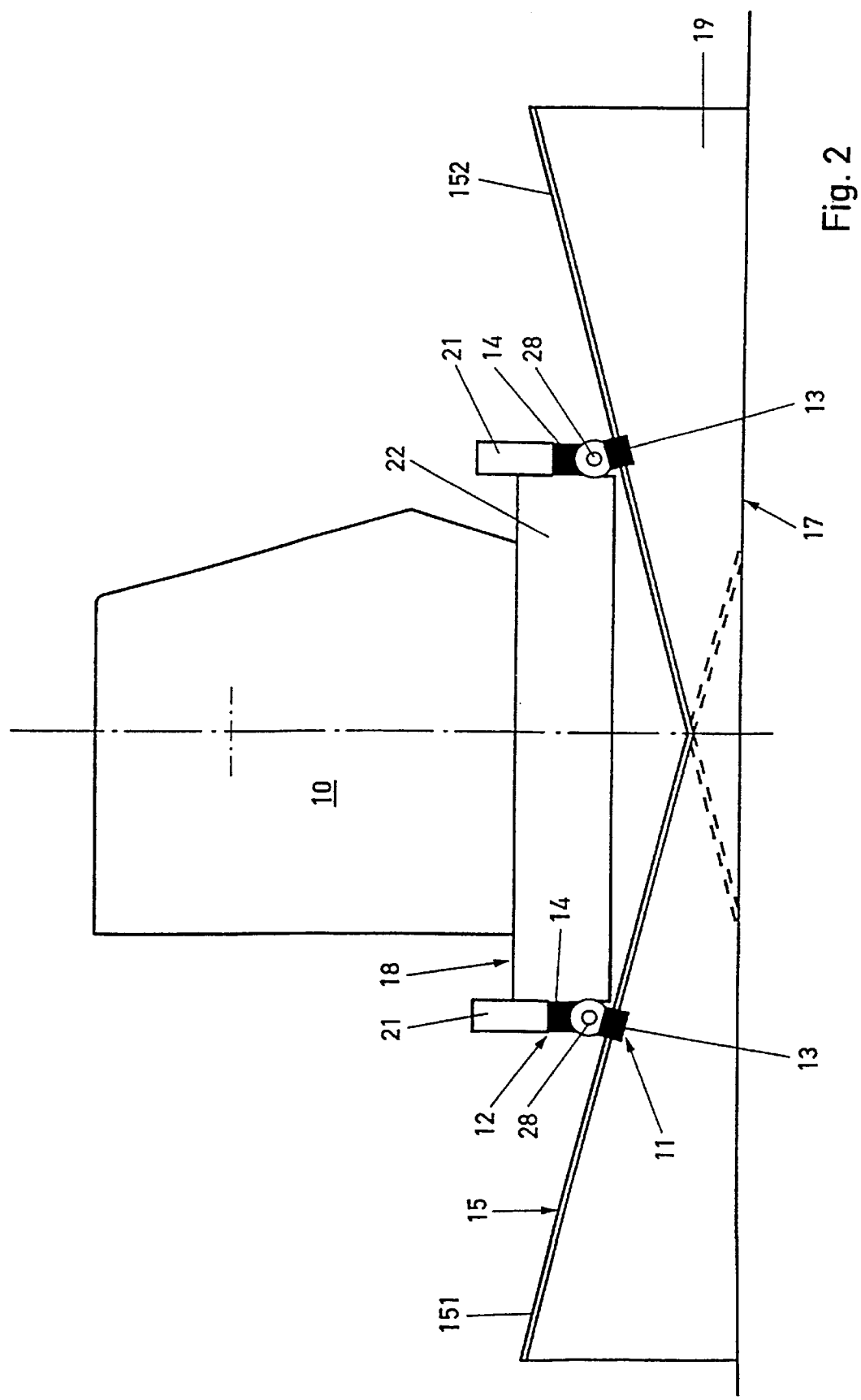
FIG. 2 a view of the apparatus according to arrow II in FIG. 1.
Figure 3:
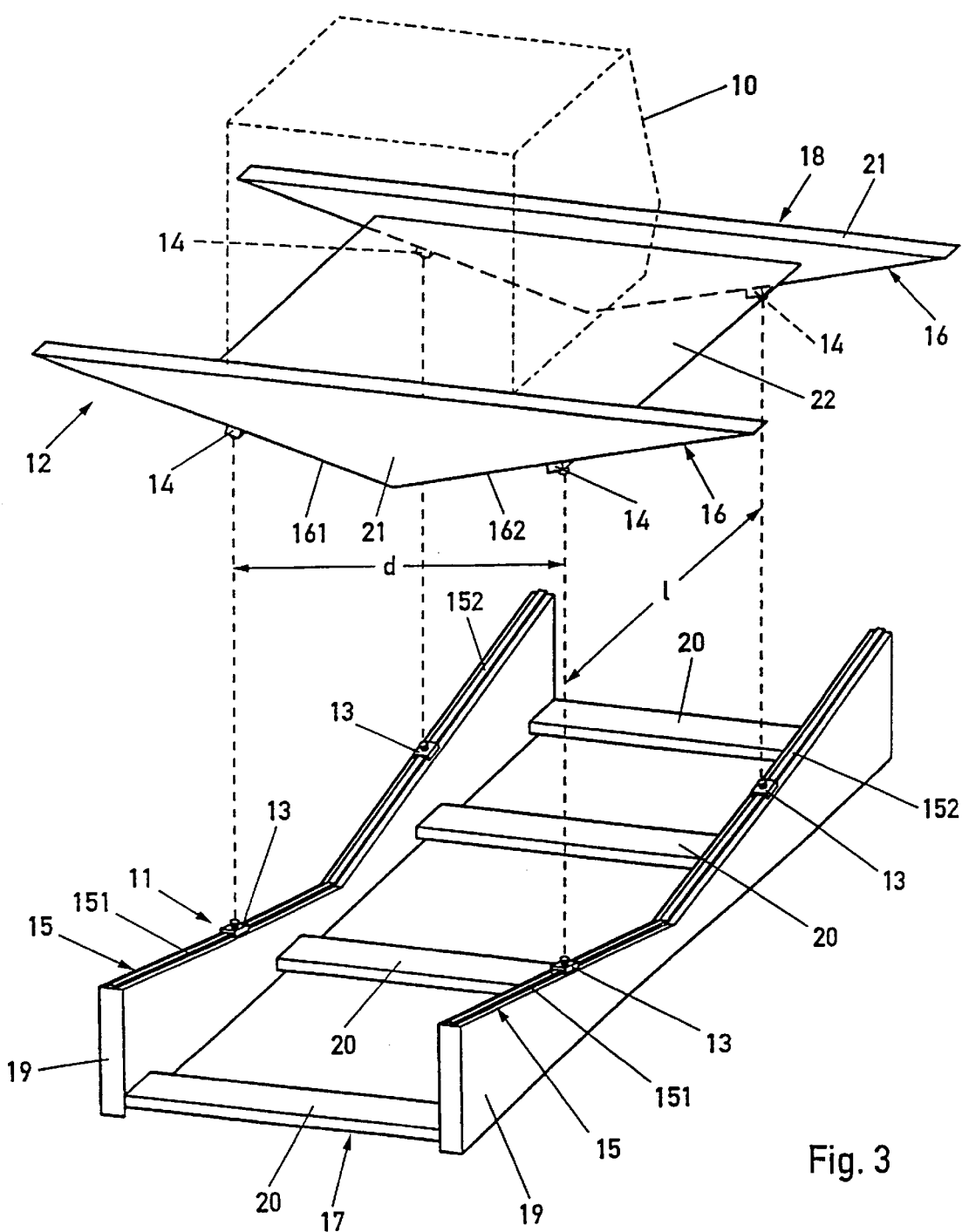
FIG. 3 an exploded view in perspective of the apparatus of FIGS. 1 and 2.
Figure 4:
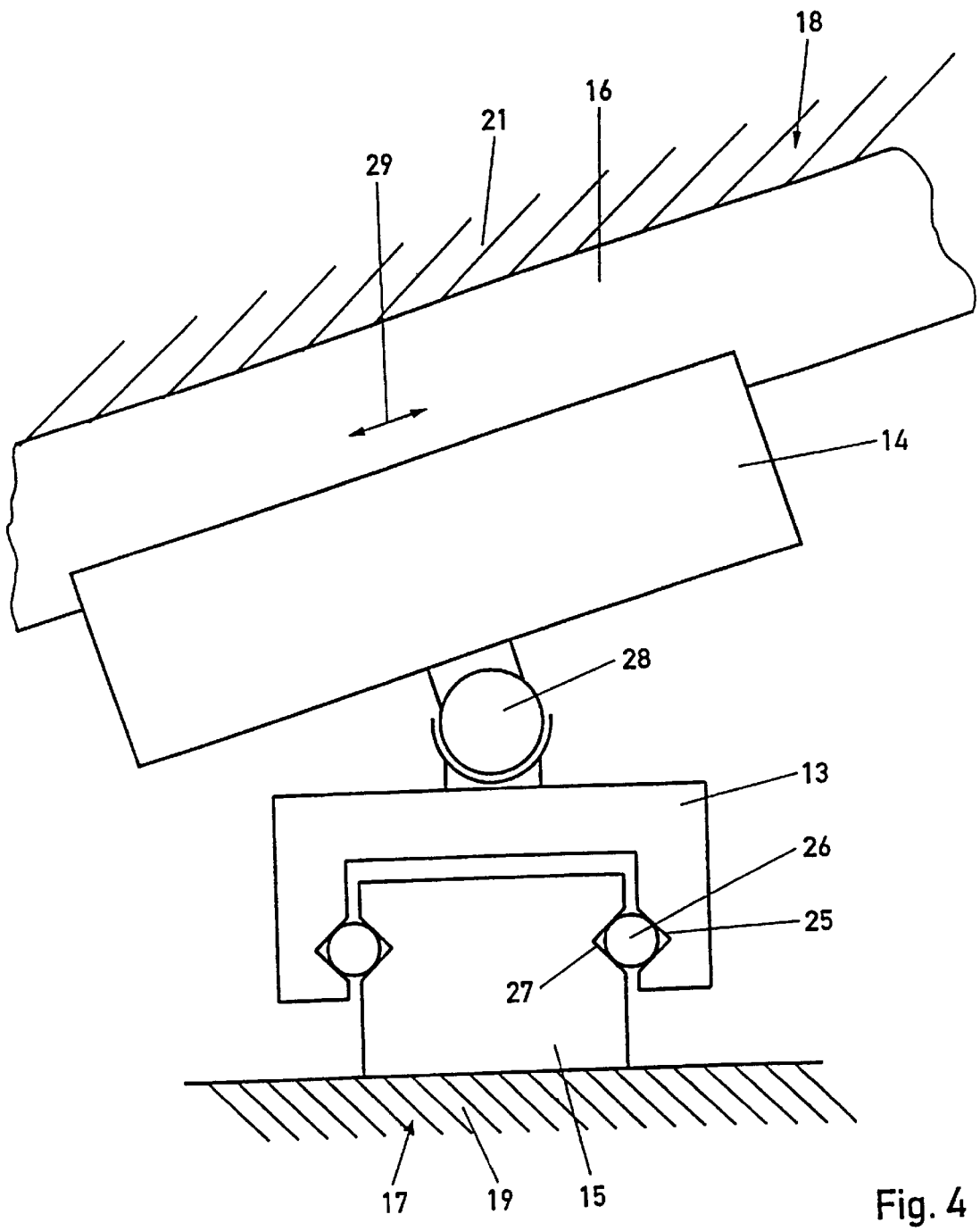
FIG. 4 an enlarged representation of the detail IV in FIG. 1.

The apparatus for simulating the motion of a vehicle compartment 10, which is shown in different views and in an exploded view in perspective in FIGS. 1 through 3, serves to simulate sustained accelerations of the vehicle compartment 10 in the longitudinal and transverse directions. It permits a virtually purely translatory motion with a simultaneous inclination of the vehicle compartment 10 in order to utilize the effect of gravity on the driver for simulating sustained accelerations. The same applies for the apparatus for motion simulation that is shown, in a further embodiment, in perspective and in two side views in FIGS. 6 through 8. The two apparatuses are constructed according to the same basic principle, with a first motion level 11 accordingly being provided for a longitudinal displacement of the compartment and a second motion level 12 being provided above the first plane for a transverse displacement of the compartment. In each motion level 11, 12, two bogie wagons 13 and 14, respectively, are disposed, with fixed longitudinal spacing from one another, to travel on one of two rails 15 and 16 disposed with fixed parallel spacing from one another. Starting from the center of the rail, each of the rails 15, 16 ascends symmetrically toward the front and rear rail regions. Each rail 15 and 16 is divided into two rail segments 151, 152 or 161, 162, respectively, which extend inclined in opposite directions or with oppositely-oriented slopes and meet at an obtuse angle in the center of the rail. The vehicle compartment 10 is received by the second motion level 12. It can be fixedly connected to the second motion level 12—as in the embodiments of FIGS. 1 through 5 and 6 through 8—or supported on this plane by way of electrical actuators that permit additional pitching and rolling motions of the vehicle compartment 10, in arbitrary directions, with respect to the second motion level 12.

In the embodiment of the apparatus for motion simulation according to FIGS. 1 through 5, this described basic principle is modified such that the rails 15 of the first motion level 11 are secured to a stationary base frame 17, and the rails 16 of the second motion plane are secured to a platform 18 that supports the vehicle compartment 10. Corresponding to the two rails 15 disposed with a parallel spacing d (FIG. 3) and having the rail segments 151 and 152, the base frame 17 comprises two ramp-like side parts 19, which are connected to one another by transverse webs 20. Two ramps are embodied on the top side of each side part 19, which ramps ascend from the center of the side part 19 toward the front or rear end of the side part 19; a rail segment 151 or 152 of the rails 15 is secured to each ramp. The platform 18 has a front and a rear triangular, transverse support 21, with the hypotenuse of the transverse support 21 pointing toward the top side of the platform 18 and the two sides that form an obtuse angle pointing toward the underside of the platform 18. The two transverse supports 21 are rigidly connected to one another by a connecting body 22 (shown in dashed lines in FIG. 1). Corresponding to the triangular shape of the transverse supports 21, the connecting body 22 is pyramidal with a triangular pyramidal cross section, and the horizontally-oriented top side of the connecting body 22 receives the vehicle compartment 10. A rail segment 161 or 162 of the rails 16 associated with the platform 18 is secured to the two sides of the two transverse supports 21 pointing down toward the base frame 17. The parallel spacing of the rails 16 is indicated by l in FIG. 3.

Two bogie wagons 13 travel on each rail 15 of the base frame 17, with each pair of bogie wagons 13 having a fixed spacing from the other that corresponds to the spacing l of the rails 16 at the platform 18. One of the two bogie wagons 13 runs on the rail segment 151 of the rail 15, and one bogie wagon 13 runs on the rail segment 152 of the rail 15. The embodiment of a transition region at the meeting point of the two rail segments 151, 152 would allow the bogie wagon 13 to run from the one rail segment 151 or 152 onto the other rail segment 152 or 151, and vice versa. Two identical bogie wagons 14 can travel on each rail 16 of the platform 18, with the two bogie wagons 14 of a bogie wagon pair being maintained with a fixed spacing from one another that corresponds to the spacing d of the two rails 15 of the base frame 17. As can be seen from FIG. 1, a bogie wagon 14 can travel on a respective rail segment 161; again, the corresponding embodiment of the meeting point of the two rail segments 161, 162 could permit the bogie wagon 14 to change over from the rail segment 161 or 162 to the other rail segment 162 or 161. The cooperation of bogie wagon 13 and rail 15 is shown in detail in FIG. 4. The bogie wagon 13 extends around both sides of the rail 15, and is supported on each side via running bearings 26 disposed in both a groove 25 in the bogie wagon and a lateral guide groove 27 in the rail 15. Because of the perpendicular orientation of the rails 15 and the rails 16 relative to one another, the bogie wagons 13 and 14 traveling on these rails 15 and 16 are oriented perpendicular to one another. As indicated schematically in FIGS. 1 and 2 and shown in detail in FIG. 4, each bogie wagon 13 is connected to a bogie wagon 14 by way of a ball-and-socket joint 28. However, a different movable connection can be produced between the bogie wagons 13 and 14 instead of a ball-and-socket joint 28, which must permit a movement about three mutually perpendicular axes of rotation. Examples of such movable connections include metal-rubber elements, as well as gas-filled or liquid–filled bellows, in which case the gas or liquid filling absorbs the weight of the platform.

To produce a translatory acceleration of the vehicle compartment 10 with a superposed inclination, one of the two bogie wagons 13 traveling on the rails 15 at the base frame 17 is driven synchronously to both sides in the longitudinal direction of the rails 15. Furthermore, the platform 18 is displaced in both directions along the rails 16 such that a bogie wagon 14 on each rail 16 is coupled to a drive fixed to the platform 18. The translatory motion of the platform 18 is indicated by a double-headed arrow 29 in FIG. 4.

Figure 5:
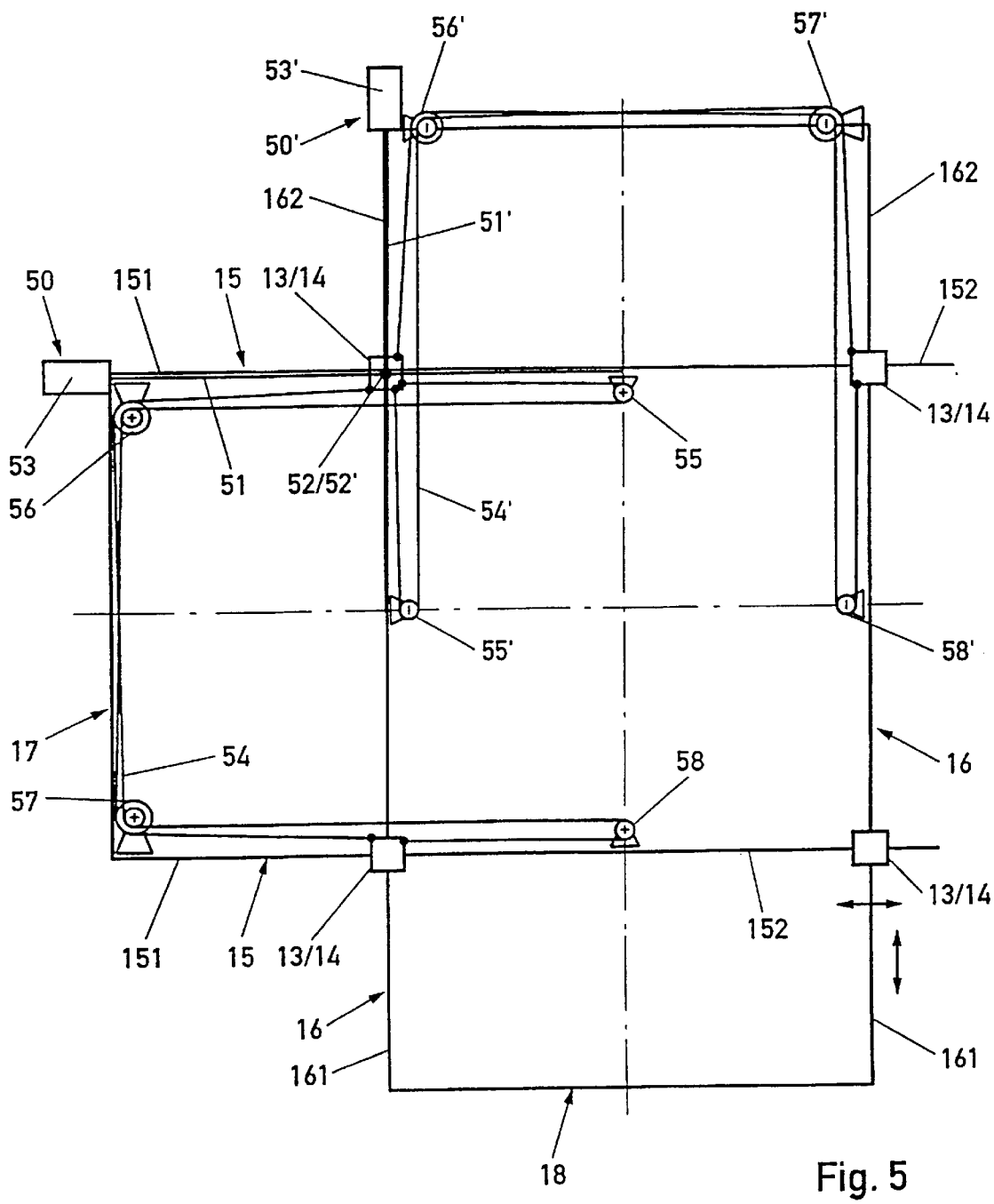
FIG. 5 a schematic plan view of the apparatus in FIG. 2.

FIG. 5 schematically shows an embodiment of the drive mechanism. The pairs of bogie wagons 13 that travel on the rails 15 of the base frame 17 and are coupled to one another by way of the ball-and-socket joint 28, and the bogie wagon 14 that travels on the rails 16 of the platform 18 (FIG. 4), are indicated by 13/14 in FIG. 5. Associated with the base frame 17 and the platform 18, respectively, is an electric-motor actuation drive in the form of a spindle drive 50 or 50', which has a spindle 51 or 51' that is driven by an electric motor 53 or 53', and a spindle nut 52 or 52' that can be screwed up and down on the spindle 51 or 51'. The spindle 51 or 51' is held so as to rotate on the base frame 17 or the platform 18, and the spindle nut 52 or 52' is hinged to a bogie wagon 13 or 14 on the one rail 15 or 16. A closed cable pull 54 or 54' leads from each bogie wagon 13 or 14 on the one rail 15 to one of the two bogie wagons 13 or 14 on the other rail 15 or 16. The cable pull 54 is guided over deflection rollers 55, 56, 57 and 58 secured to the base frame 17, while the cable pull 54' is guided over deflection rollers 55', 56', 57', and 58' secured to the platform 18. Two deflection rollers 55, 56 or 57, 58 (correspondingly, 55', 56' or 57', 58') are respectively disposed at the end of the paths of displacement of the two bogie wagons 13 (correspondingly, 14), that is, at the ends of the rail segments 151 (correspondingly, 161).

If the electric motor 53 rotates, the spindle 51 is screwed further into or out of the spindle nut 52, causing the bogie wagon pair 13/14 to travel along the rail 15 in one or the other direction. The cable pull 54 displaces the other bogie wagon pair 13/14 by the same path of displacement on the other rail 15. Thus, the entire platform 18 travels along the two rails 15.

If the electric motor 53' rotates, the spindle 51' is screwed up or down in the spindle nut 52' at the bogie wagon 14. Hence, the position of the bogie wagon 14 relative to the platform 18 changes, and the cable pull 54' also changes the relative position of the bogie wagon 14 on the other rail 16. Because the two bogie wagons 14 are fixed on the two rails 15 at the base frame 17 by their connection to the bogie wagon 13, the entire platform 18 is displaced transversely to the base frame 17.

Figure 6:
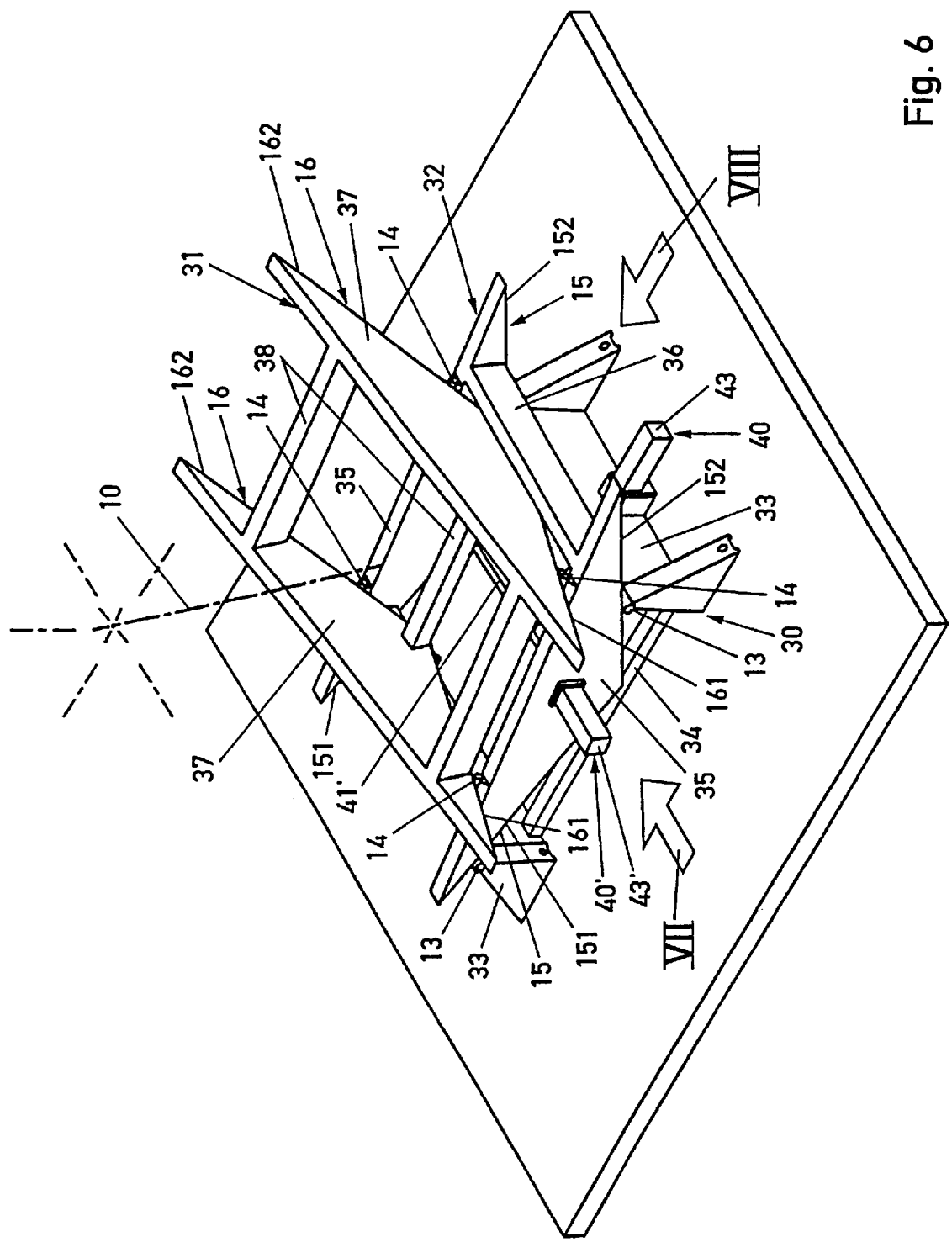
FIG. 6 a view in perspective of a second embodiment of an apparatus for simulating motion, FIG. 7 a view of the apparatus according to arrow VII in FIG. 6, and FIG. 8 a view of the apparatus according to arrow VIII in FIG. 6.

The further embodiment of the apparatus for motion simulation, which is shown in FIGS. 6 through 8 and operates according to the same basic principle, again has a stationary base frame 30 and a platform 31 that supports the vehicle compartment 10, only indicated schematically. In contrast to the apparatus according to FIGS. 1 through 5, an additional intermediate frame 32 is provided between the base frame 30 and the platform 31. The base frame 30 comprises two side parts 33 that are spaced from one another and are connected to one another by transverse webs 34. The intermediate frame 32 comprises a triangular, front transverse support 35 and an identical, rear transverse support 35, which are connected to one another by longitudinal webs 36. The triangular transverse supports 35 are disposed such that their hypotenuses point up and their two sides meeting at an obtuse angle point down toward the base frame 30. The base frame 30 and the intermediate frame 32 define the first motion plane 11 of the system, with the rails 15 associated with this motion plane 11 being secured to the sides of the transverse supports 35. The rails 15 on each transverse support 35 are again divided into two rail segments 151 and 152, which respectively lie on a cathetus of the transverse support 35. The bogie wagons 13 that travel on the rails 15 are secured to the base frame 30 with spacing from one another, specifically two bogie wagons 13 on the top side of the side parts 33. The spacing between the two bogie wagons 13 disposed on a side part 33 is determined by the parallel spacing of the two rails 15 at the intermediate frame 32.

The platform 31 is constructed in the same manner as the intermediate frame 32, but its position on the intermediate frame 32 is rotated by 90° in the plane. It has two triangular longitudinal supports 37, which are connected to one another by transverse webs 38. The triangular tips of the longitudinal supports 37 point toward the intermediate frame 32, and their sides meeting at an obtuse angle support the rails 16 of the second motion plane 12, which are again divided into two rail segments 161 and 162 and are secured to each cathetus of the longitudinal support 37. The bogie wagons 14 of the second motion plane, which travel on the rails 16, are secured to the top side of the intermediate frame 32, specifically to the hypotenuse of the triangular transverse supports 35 of the intermediate frame 32. The spacing between the two bogie wagons 14 disposed on a transverse support 35 of the intermediate frame 32 is determined by the spacing between the two rails 16 on the sides of the longitudinal supports 37 of the platform 31.

The intermediate frame 32 and the platform 31 are displaceable to both sides in the longitudinal direction of their rails 15 and 16, respectively, which can be effected pneumatically, hydraulically or with an electric motor. In the embodiment of FIGS. 6 through 8, actuating drives with electric motors are provided in the form of two spindle drives 40 and 40'. Each spindle drive 40 and 40' includes a spindle 41 or 41' that is driven by an electric motor 43 or 43', and a spindle nut 42 or 42' that can be screwed up and down on the spindle 41 or 41'. In the spindle drive 40 for the intermediate frame 32, the spindle 41 is seated in the base frame 30 and extends in the center between the rails 15 at the intermediate frame 32. The spindle nut 42 is secured to a longitudinal web 36 of the intermediate frame 32, which extends from tip to tip of the two triangular transverse supports 35 of the intermediate frame 32. In the spindle drive 40' for the platform 31, the spindle 41' is disposed with an electric motor 43' in the intermediate frame 32, with the spindle 41' extending in the center between the rails 16 at the platform 31. The spindle nut 42' is disposed at a transverse web 38 extending between the tips of the two triangular longitudinal supports 37. Depending on the direction of rotation of the electric motors 43, 43', the platform 18 is displaced, with its rails 16, in one or the other direction on the bogie wagons 14 at the intermediate frame, and the intermediate frame 32 is displaced, with its rails 15, in the one or the other direction on the bogie wagons 13 of the base frame 30.

The invention is not limited to the above-described embodiments. Thus, the rail segments 151 and 152 or 161 and 162 of equal length need not converge as straight lines to an obtuse angle. The rails 15, 16 can also be bent or possess a special curve that is adapted to specific conditions. In the embodiment of the apparatus according to FIGS. 1 through 3, for example, the rail segments 151 and 152 of equal length at the base frame 17 can extend with opposed inclinations and with parallel offset, and—as indicated by dashed lines in FIG. 2—can cross at an obtuse angle. This crossing permits a greater horizontal deflection and a larger angle of inclination with the same dimensions of the platform 18.

The bogie wagons 13, 14 can, of course also be replaced by other rolling elements, and the rails can be replaced by roller tracks that cooperate with the rolling elements.

The two rails 15 at the base frame 17 and the two rails 16 at the platform 18 having the rail segments 151 and 152 and 161 and 162, respectively, can also be replaced by a pair of rails extending with parallel spacing from one another. A bogie wagon 13 or 14 then travels on each rail segment of the rail pair, with a total of four bogie wagons 13 or 14 for each rail pair. The two bogie wagons 13 and 14 traveling on parallel rail segments of the rail pair are connected by a connecting plate to form a bogie wagon pair. The ball-and-socket joints 28 are disposed between the connecting plates of two bogie wagon pairs associated with the base frame 17 and the platform 18.

I claim:

1. An apparatus for simulating longitudinal and transverse accelerations on a vehicle compartment of a vehicle, said apparatus comprising:

a first motion level for longitudinal displacement of the compartment having a pair of first rails with fixed parallel spacing, said first rails ascending uniformly, at least in the front and rear regions of the first rail ends, and symmetrically from the center of the rails;

a stationary base frame, said first rails being secured to said stationary base frame;

a pair of longitudinal bogie wagons disposed on one of said first rails with fixed longitudinal spacing there between so that said longitudinal bogie wagons travel on said one of the pair of first rails;

a second motion level, which is located above the first motion level, for a transverse displacement of the compartment having a pair of second rails, said second rails having a fixed parallel spacing there between, extending perpendicular to said first rails in the first motion plane, and ascending uniformly, at least in the front and rear regions of the second rail ends, and symmetrically from the center of the second rails;

a platform having an underside and supporting said vehicle compartment, the underside of said platform facing said base frame, said second rails being secured to said underside of the platform;

a pair of traverse bogie wagons disposed on one of said pair of second rails with fixed longitudinal spacing there between so that said traverse bogie wagons travel on said one of the second rails; and a movable connection with three mutually perpendicular axes of rotation provided between each of said longitudinal bogie wagons that travel on said first rail and an associated traverse bogie wagon that travels on said second rail of the platform.

2. The apparatus according to claim 1, wherein said movable connection is produced by a ball-and-socket joint.

3. The apparatus according to claim 1, further comprising an actuating drive which acts on one of a longitudinal or a traverse bogie wagon that travels on one of the one of the first and second rails at the base frame and the platform, respectively, so as to synchronize the displacement of the longitudinal and traverse bogie wagons.

4. The apparatus according to claim 3, wherein said drive is secured to both the base frame and the platform, said drive engaging one of a longitudinal or a traverse bogie wagon, and the other one of the longitudinal or traverse bogie wagon being coupled to the engaged bogie wagon for performing synchronous motion.

5. The apparatus according to claim 4, wherein said drive is controlled by an electric motor and is configured as a spindle drive having a spindle that is actuated by the electric motor and is seated at either the base frame or the platform, and a spindle nut that is hinged to either the longitudinal or traverse bogie wagon and is screwed up and down on the spindle.

6. The apparatus according to claim 4, wherein the synchronous coupling of the other bogie wagon at the base frame or the platform is effected by a closed cable pull that is guided over deflection rollers.

7. An apparatus for simulating longitudinal and transverse accelerations on a vehicle compartment of a vehicle, said apparatus comprising:

a first motion plane for longitudinal displacement of the compartment having a pair of first rails with fixed parallel spacing, said first rails ascending uniformly, at least in the front and rear regions of the first rail ends, and symmetrically from the center of the rails;

a stationary base frame;

an intermediate frame having an underside and a top side, said first rails being disposed on the underside of said intermediate frame, a pair of longitudinal bogie wagons associated with said first motion plane are secured to said stationary base frame and travel on one of said first rails with fixed longitudinal spacing there between;

a second motion plane, which is located above the first motion plane, for a transverse displacement of the compartment having a pair of second rails, said second rails being secured to the top side of said intermediate frame and having a fixed parallel spacing there between, said second rails extending perpendicular to said first rails in the first motion level, and ascending uniformly, at least in the front and rear regions of the second rail ends, and symmetrically from the center of the second rails;

a platform having an underside and supporting said vehicle compartment, the underside of said platform facing said intermediate frame, said second rails being secured to said underside of the platform; and a pair of traverse bogie wagons secured to the top side of said intermediate frame travel on one of said pair of second rails with fixed longitudinal spacing there between.

8. The apparatus according to claim 7, wherein the intermediate frame and the platform are displaceable to both sides in the longitudinal direction of their respective first and second rails.

9. The apparatus according to claim 6, further comprising a spindle drive respectively disposed at the base frame and at the intermediate frame, each drive having a spindle that is driven by an electric motor, and a spindle nut which screws up and down on the spindle, said spindles of each drive extend perpendicular to one another and are disposed in the center between the respective first or second rails, said spindle nuts being hinged in the center to the respective intermediate frame or the platform.

10. The apparatus according to claim 1, wherein each first rail forms an obtuse angle in its center and each second rail forms an obtuse angle in its center such that each first and second rail form rail segments of equal length and that meet at the obtuse angle.

11. The apparatus according to claim 1, wherein each first and second rail is curved in an arc shape.

12. The apparatus according to claim 1, wherein each of the first rails secured to the base frame comprises two rail segments that extend with opposing inclinations and with parallel offset, and meet at an obtuse angle.

13. The apparatus according to claim 1, wherein said movable connection is produced by a cardan joint that can rotate about the height axis.

14. The apparatus according to claim 1, wherein said movable connection is produced by a metal-rubber element.

15. The apparatus according to claim 1, wherein said movable connection is produced by a gas or liquid filled bellows.

16. The apparatus according to claim 1, wherein the actuating drive is controlled pneumatically.

17. The apparatus according to claim 1, wherein the actuating drive is controlled hydraulically.

18. The apparatus according to claim 8, wherein the intermediate frame and the platform are displaceable by pneumatic or hydraulic means.

19. The apparatus according to claim 7, wherein each first rail forms an obtuse angle in its center and each second rail forms an obtuse angle in its center such that each first and second rail form rail segments of equal length and that meet at the obtuse angle.

20. The apparatus according to claim 7, wherein each first and second rail is curved in an arc shape.

\* \* \* \* \*